United States Patent
Asati et al.

(10) Patent No.: US 7,987,259 B2
(45) Date of Patent: Jul. 26, 2011

(54) METHOD AND SYSTEM FOR PROVIDING AD-SPLICER REDUNDANCY IN A CABLE/MSO NETWORK

(75) Inventors: Rajiv Asati, Morrisville, NC (US); Toerless Eckert, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 777 days.

(21) Appl. No.: 11/422,308

(22) Filed: Jun. 5, 2006

(65) Prior Publication Data
US 2007/0283038 A1    Dec. 6, 2007

(51) Int. Cl.
G06F 15/173    (2006.01)
(52) U.S. Cl. ........ 709/224; 709/223; 709/238; 709/245; 709/250
(58) Field of Classification Search .......... 709/223–224, 709/238–239, 242, 245–246, 250
See application file for complete search history.

(56) References Cited

U.S. PATENT DOCUMENTS

| | | | | |
|---|---|---|---|---|
| 6,128,666 | A * | 10/2000 | Muller et al. | 709/238 |
| 6,487,721 | B1 * | 11/2002 | Safadi | 725/36 |
| 6,798,739 | B1 * | 9/2004 | Lee | 370/216 |
| 6,839,070 | B2 * | 1/2005 | Meandzija et al. | 709/223 |
| 7,092,399 | B1 * | 8/2006 | Cheriton | 370/401 |
| 7,359,377 | B1 * | 4/2008 | Kompella et al. | 709/224 |
| 7,376,829 | B2 * | 5/2008 | Ranjan | 713/153 |
| 7,546,619 | B2 * | 6/2009 | Anderson et al. | 725/35 |
| 7,730,509 | B2 | 6/2010 | Boulet et al. | |
| 2002/0178443 | A1 | 11/2002 | Ishii | |
| 2007/0283038 | A1 | 12/2007 | Asati et al. | |
| 2009/0132356 | A1 | 5/2009 | Booth et al. | |
| 2009/0217318 | A1 | 8/2009 | VerSteeg et al. | |
| 2010/0054707 | A1 | 3/2010 | Karaoguz et al. | |
| 2010/0107001 | A1 | 4/2010 | Asati et al. | |

OTHER PUBLICATIONS

"Release Notes for Cisco Gigabit-Ethernet Optimized Video Networking Solution for Cable, Release 3.0," Cisco Systems, Inc., Feb. 6, 2006, pp. 1-14.
"Solution Architecture and Optimizations," Cisco Systems, Inc., Mar. 28, 2006, pp. 1-44.
"MPEG-4 AVC (H.264) Ad Insertion Solution—White Paper, Revision 1.0." by Harmonic. Jul. 2007.
"SeaChange Spot+ Software, Version 1.3, QuickSpec." by SeaChange Intl. copyright 2010.
Swartz, Terri. "Protecting Ad Revenue Streams with SeaChange Spot+ Software—White Paper." SeaChange Intl. Copyright 2005.

* cited by examiner

Primary Examiner — Bharat N Barot
(74) Attorney, Agent, or Firm — Cesari and McKenna, LLP; Michael R. Reinemann

(57) ABSTRACT

Method and system for providing ad-splicer N+1 redundancy in a network by employing IP network intelligence and techniques to facilitate a redundant ad-splicer assuming, within a few seconds, the functionality of the failed primary ad-splicer. The network triggers the installation of unicast and multicast routes on an interface by tracking one or more unicast routes to deliver the unicast and (pre-spliced) multicast traffic to the redundant ad-splicer. The network dynamically adjusts the multicast trees to continue to deliver the post-spliced multicast traffic to the intended receivers.

23 Claims, 4 Drawing Sheets

METHOD AND SYSTEM FOR PROVIDING AD-SPLICER REDUNDANCY IN A CABLE/MSO NETWORK

FIELD OF THE INVENTION

The present invention relates to data network management. More specifically, the present invention relates to methods and systems for providing network based provisioning of N+1 redundancy for ad splicer in an IP/MPLS network such as cable/multiple service operator (MSO) network or in a wireline network.

BACKGROUND

In a typical cable/MSO network, the ad splicer plays a significant role due to its ability to splice the advertisements or commercials into the live video streams using analog or Digital Program Insertion (DPI). More specifically, an ad server typically stores the commercial content and streams it to the ad splicer when triggered by digital cues. Using digital ad insertion standard such as DVS 253 (which supports the cable based DPI cueing message) or SCTE35, the ad splicer is configured to splice the MPEG commercial video streams into the programmer's digital streams. The ad splicer also allows the operator to select among multiple programmer video streams, providing outgoing signal carriage of only those networks carried by the operator.

A single market may typically have as many as 40 different advertisement zones which may be demographically grouped areas of a market that receive the same advertising content. A single hub in the network may be configured to serve multiple advertisement zones. Since each ad splicer serves a single advertisement zone, a hub with multiple advertisement zones includes a set of ad splicers for each advertisement zone.

Video and content service providers have relied upon the ad splicer capability to insert the appropriate advertisements or commercials into the live video streams as a substantial revenue source. Thus, ad splicer failure or downtime has significant impact both in real time transmission service disruption as well as loss of potential revenue from advertisements or commercials which do not get transmitted. Indeed, the undesirable mean time to repair such ad splicer failure can range from a few minutes to several hours.

Present approaches to address ad splicer failure include human intervention where a technician is dispatched to the HUB site to physically move the links from the failed ad splicer to a redundant ad splicer in the HUB site.

In view of the foregoing, it would be desirable to have methods and systems to improve the overall mean time to repair (MTTR) network downtime due to ad splicer failure.

DETAILED DESCRIPTION

Figure 1:
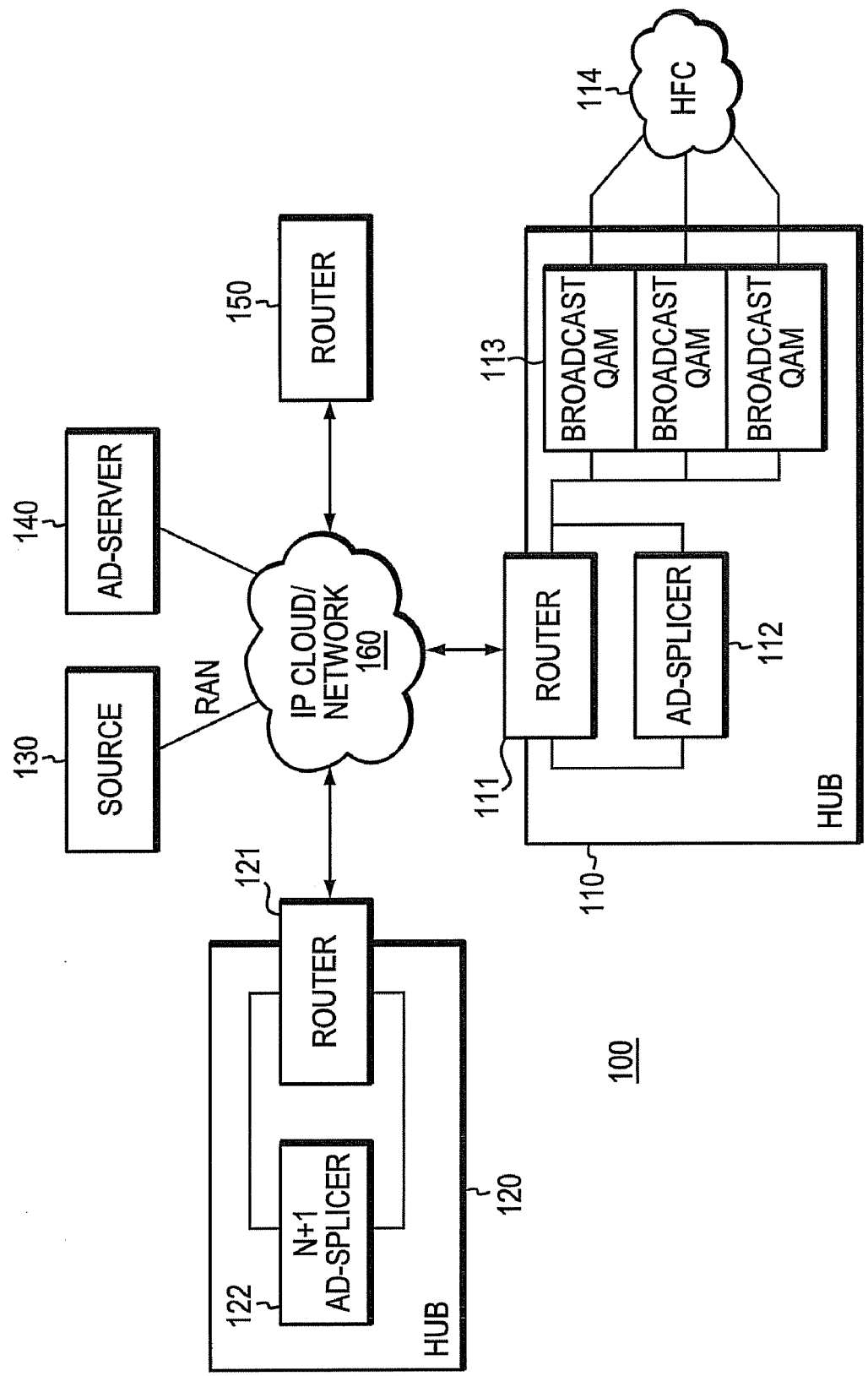
FIG. 1 is a block diagram of a data and content network such as a regional access network (RAN) for practicing one or more embodiments of the present invention.

FIG. 1 is a block diagram of a data and content network such as a regional access network (RAN) for practicing one or more embodiments of the present invention. Referring to FIG. 1, a regional access network (RAN) 100 includes a HUB site 110 configured with a primary router 111 coupled to a primary ad splicer 112. The primary router 111 is also connected to a plurality of receivers such as broadcast QAM 113 in the HUB site 110, each of which are connected to the hybrid fiber coax (HFC) 114. As shown in the FIG. 1, the primary router 111 is coupled to the IP cloud/data network 160 to receive and/or transmit data.

Referring to FIG. 1, the router 111 is also coupled to the IP cloud/data network 160 in the network 100 for communication a content source terminal 130 and 5 the ad server 140, and configured to receive the pre-spliced multicast traffic and the ad traffic, respectively, from routers 121 and 150, for example, over the IP cloud/data network 160 as shown in the Figure. Also shown in FIG. 1 is a second HUB site 120 including the router 121 and redundant ad splicer 122. Within the scope of the present invention, the second HUB site 120 with the router 121 and the redundant ad 10 splicer 122 may be configured to support multiple HUB sites in the regional access network 100.

More specifically, in one embodiment of the present invention, when the ad splicer 112, which is configured to receive and transmit multicast traffic, fails, the router 111 that is directly connected to the ad splicer 112 is configured to withdraw the route to the ad splicer 112 from the Interior Gateway Protocol (IGP). Upon the IGP convergence, the router 121 that is connected to the redundant ad splicer 122 is configured to route the unicast traffic which was intended for the failed ad splicer 112 and includes the ad traffic and the pre-spliced multicast traffic, to the redundant ad splicer 122. In one embodiment, the redundant ad splicer 122 is configured to splice the incoming unicast traffic routed by the router 121, and to transmit the post-spliced multicast traffic to the router 121. Thereafter, the post spliced traffic is delivered to the intended QAM 113 via the router 111.

Referring back to FIG. 1, in one embodiment of the present invention, using Protocol Independent Multicast-Source Specific Multicasting (PIM-SSM), the router 111 is configured to build the source-group (S, G) tree to router 121 which is connected to the redundant ad splicer 122 substantially immediately after the IGP convergence as the route to the source S is available via router 121. Thus, the post spliced traffic may be delivered to the QAM 113 via the router 111. Referring again to FIG. 1, in the case where Protocol Independent Multicast in Sparse Mode (PIM-SM) is used in the network 100, the router 121 is configured to register with the rendezvous-point (RP) upon receiving the post spliced multicast traffic from the redundant ad splicer 122. The rendezvous point (RP) is then configured to build the source-group (S, G) to the router 121 to receive the multicast traffic natively. Thus, the post spliced traffic is then appropriately delivered to the QAM 113 via the router 111.

The multicast routers such as routers 111, 121, and 150 are configured to maintain the state regarding the incoming and outgoing interfaces for each source-group (S, G) pair. The maintained state is used to determine which data packets are to be discarded and which are to be forwarded. The state information is maintained in a multicast routing table by each multicast router 111,121,150, where each entry in the multicast routing table corresponds to a unique source-group (S, G) pair referred to as an mroute, each mroute containing four types of entries—(1) address of the multicast group, (2)

address of the corresponding source, (3) the incoming interface, and (4) a list of outgoing interfaces.

Referring back to FIG. 1, in one embodiment of the present invention, the redundant ad splicer 122 is connected to the router 121 in the network 100 via an interface namely gig1/1, and provisioned with an enhanced mapping table. More specifically, the redundant ad splicer 122 in one embodiment is configured to accept multicast traffic (S 1, G 1) intended for the primary ad splicer 112 without sending out an (S 1, G 1) IGMP join on the interface gig1/1 to the router 121. Upon receiving the multicast traffic (S 1, G 1), the redundant ad splicer 122 is configured to splice the pre spliced multicast traffic, and generate to post spliced multicast traffic with (S2, G2) IP addresses. The (S2, G2) IP address is obtained through the pre-defined mapping table which maps or associates the incoming pre spliced traffic (S 1, G 1) to the IP address of the outgoing multicast traffic (S2, G2).

The router 121 is configured with the floating unicast static routes with the next hop as the gig1/1, with admin distance of 254, for example. In one embodiment, the floating unicast static routes include the IP addresses of the ad splicers receiving the ad traffic. More specifically, each static route is destined to an IP address of the primary ad splicer 112 that is configured to receive the pre-spliced multicast traffic for one or more Group addresses (including G 1). For example, in one embodiment of the present invention, the floating static route may be configured on router 121 as follows:

router (conf)#ip route <SI>gig111 254
    router (conf)#ip route <S2>gig111 254 where S 1 represents the IP address used by the primary ad splicer 112 to receive the ad traffic, and further, where S2 represents the IP address used by the primary ad splicer as the source IP address of the post spliced multicast traffic.

In this manner, as described above, in one embodiment of the present invention, the floating unicast static route is installed in the routing table of the router 121 connected to the redundant ad splicer 122 (and other routers in the network) if the IGP learned routes to the IP addresses S1, S2, respectively, are not available, for example, in the event of the ad splicer 112 failure.

Referring again to FIG. 1, the router 121 in one embodiment of the present invention is also configured with an artificially high metric value, which is close to maximum, such as "15555555" in case of OSPF or "3294967295" in case of ISIS, for example, so that the devices and terminal connected to the network 100 do not prefer the path to the router 121. That is, when the primary ad splicer 112 returns back to functional service in the network 100, the IGP converges, and each network device immediately starts using the primary ad splicer 112. For example, in one embodiment of the present invention, the Router 121 may be configured with "redistribute static metric 15555555" within the IGP (that is, Open Shortest Path First (OSPF) or Intermediate System to Intermediate System (ISIS)). This configuration is provided so that the devices connected to the network 100 prefer the routes to the primary ad splicer 112, if available and functional. In one embodiment, the following routine may be used to configure Router 121:

router ospf 1
    redistribute static metric 15555555

In another embodiment, the following routine may be used to configure Router 121:

router isis
    redistribute static ip metric 3294967295

It is to be noted that while 15555555 is used in the description above to represent an artificially high metric value, other artificially high values may be used (where the highest value being 0xFFFFFE=16777214), such that routes to the primary ad splicer 112 is always preferred in the network 100 by the network devices if the primary ad splicer 112 is available.

Referring still to FIG. 1, in the manner described above, in one embodiment of the present invention, router 121 may be configured to dynamically inject the reverse mroute when the primary ad splicer 112 fails. That is, in one embodiment, during the primary ad splicer 112 failure, the router 121 connected to the redundant ad splicer 122 is configured to dynamically assign the static Internet Group Management Protocol (IGMP) group membership to the redundant ad splicer 122. A terminal or device in the network 100 may transmit an IGMP membership report message to join a multicast group, where the IGMP is common to all multicast router protocols, and isolates end users from the routing protocol in use.

In this manner, during the time period when the primary ad splicer 112 is in failure mode, the redundant ad splicer 122 may be configured to receive the relevant pre-spliced traffic intended for the primary ad splicer 112 so that the network 100 may be configured to dynamically modify the delivery of the pre-spliced traffic to the redundant ad splicer 122 during primary ad splicer 112 failure, and to deliver the post spliced traffic to the intended receivers such as QAMs 113 during the primary ad splicer 112 failure.

In this manner, within the scope of the present invention, one redundant ad splicer 122 may be configured to back up more than one ad splicer in the various HUB sites in the regional access network. In addition, overall mean time to repair (MTTR) may be substantially improved by configuring the network 100 to converge and dynamically provide the redundancy, in addition, to obviating the need for on-site repair at the HUB site of the failed ad splicer.

Figure 2:
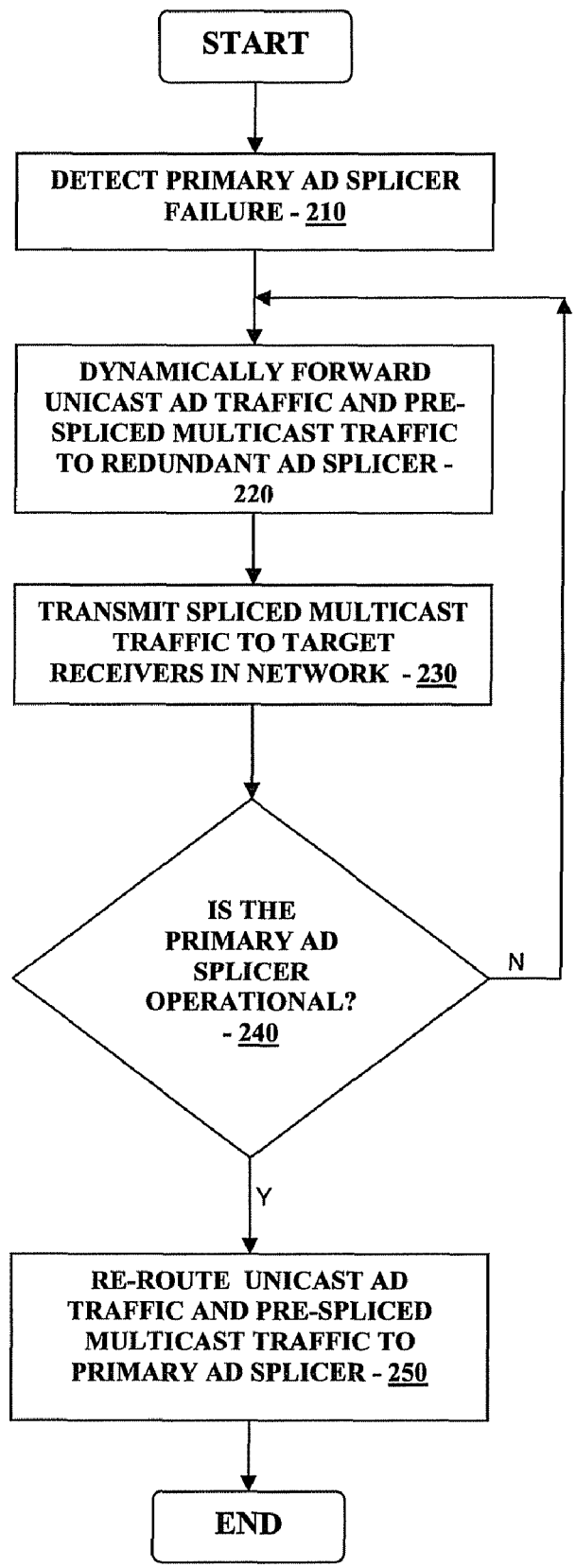
FIG. 2 is a flowchart illustrating the process for providing ad splicer redundancy in a data and content network in accordance with one embodiment of the present invention.

FIG. 2 is a flowchart illustrating the process for providing ad splicer redundancy in a data and content network in accordance with one embodiment of the present invention. Referring to FIGS. 1 and 2, in normal operation, the primary ad splicer 112 is configured to receive the pre spliced multicast traffic for (S 1, G 1) and to generate the corresponding post spliced (S2, G2) multicast traffic after splicing it. The primary ad splicer 112 in this functional mode is configured also to receive the ad traffic using the S 1 source address to reference itself.

Referring now to FIG. 2, at step 210 the primary ad splicer failure 112 is detected. Thereafter, at step 220, in one embodiment of the present invention, the unicast ad traffic and the pre spliced multicast traffic is dynamically forwarded to the redundant or backup ad splicer 122 (FIG. 1). As discussed above, the redundant ad splicer is configured with the enhanced mapping table to support the network traffic in the event of the primary ad splicer 112 failure. That is, in one embodiment, the router 121 connected to the redundant ad splicer 122 is configured to dynamically inject an mroute to the routing table of the redundant ad splicer 122. In this manner, when the primary ad splicer 112 failure is detected, the network 100 is configured to dynamically route the unicast traffic and the pre spliced multicast traffic to the redundant ad splicer 122.

Referring back to FIG. 2, after splicing the traffic, the post spliced multicast traffic including ad traffic is provided to the router 121 connected to the redundant ad splicer 122, and at step 230, the router 121 is configured to transmit the spliced multicast traffic and the ad traffic to the intended or target receivers (for example, the QAMs 113) in the network 100. Thereafter, at step 240 it is determined whether the primary ad splicer 112 (FIG. 1) has returned to operational mode from its failed status. If at step 240 it is determined that the primary ad splicer 112 is not operational, then the routine returns to step 220, and continues to dynamically forward the unicast ad traffic and the pre spliced multicast traffic to the redundant ad splicer 122 (FIG. 1). On the other hand, if it is determined at step 240 that the primary ad splicer 112 has returned from its failure mode and is once again operational, then at step 250, the unicast ad traffic and the pre spliced multicast traffic is re routed to the primary ad splicer 112 as intended, and the redundant ad splicer 122 withdraws. For example, as discussed above in conjunction with FIG. 1, the router 121 directly connected to the redundant ad splicer 122 is configured with an artificially high metric values within the IGP so that each network device or router in the network 100 is configured to prefer the routes to the primary ad splicer 112 when the primary ad splicer 112 is operational.

Referring still to FIG. 2, while the determination of whether the primary ad splicer 112 (FIG. 1) is identified as step 240 in the routine described above, within the scope of the present invention, the network 100 may be configured such that the operational mode of the primary ad splicer 112 from a failure mode is continuously monitored. Alternatively, the primary ad splicer 112 may be configured to broadcast its operational status upon exiting the failure mode and enters the network 100 such that the ad traffic and the pre-spliced multicast traffic intended for the primary ad splicer 112 are provided to the primary ad splicer 112 when it is operational.

Figure 3:
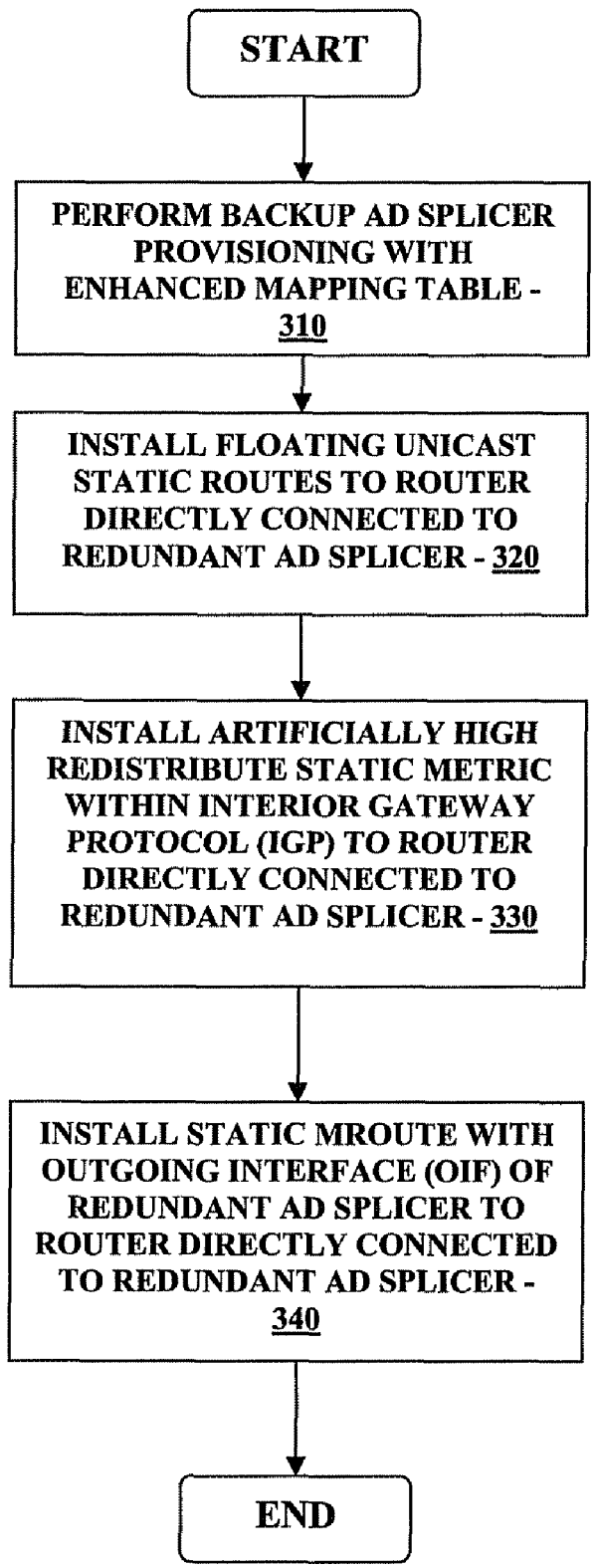
FIG. 3 is a flowchart illustrating dynamic forwarding of unicast at traffic and pre-spliced multicast traffic to backup ad splicer of step 220 shown in FIG. 2 in accordance with one embodiment of the present invention.

FIG. 3 is a flowchart illustrating dynamic forwarding of unicast ad traffic and pre-spliced multicast traffic to backup ad splicer of step 220 shown in FIG. 2 in accordance with one embodiment of the present invention. Referring to FIG. 3, in one embodiment of the present invention, at step 310, the router 121 connected to the redundant ad splicer 122 through a gigll1 interface, for example, is provisioned with enhanced mapping table. That is, in one embodiment of the present invention, router 121 is configured to accept the multicast traffic (SI, G1) even if it did not send out an (SI, G 1) IGMP join on the interface gigll1 to the router 121.

Thereafter at step 320, the floating unicast static routes to router 121 are installed at step 320. As discussed above, the floating unicast static routes installed in the routing table of router 121 include, for example, IP addresses of the primary ad splicer 112 that is configured to receive the ad traffic. Referring back to FIG. 3, after installing the floating unicast static routes to the routing table of router 121 connected to the redundant ad splicer 122, at step 330, the artificially high static metric is installed within the interior gateway protocol (IGP) to the Router 121. This configuration allows the ad traffic and the pre spliced multicast traffic to be re-routed to the primary ad splicer 112 when it becomes operational and exits the failure mode. Thereafter, at step 340, the static mroute with outgoing interface OIF of the redundant ad splicer 122 is installed in the Router 121.

When the primary ad splicer 112 failure is detected, the router 111 which is directly connected to the primary ad splicer 112 withdraws the routes to the primary ad splicer 112 from the IGP. After the IGP converges, router 121 is configured to install the floating static route to the redundant ad splicer from its routing table and to redistribute the floating static route into the IGP with the artificially high metric value. In this manner, the router 121 may in one embodiment be configured to substitute the redundant ad splicer 122 for the failed primary ad splicer 112 such that, the devices and terminals in the network 100 including the router 111 at the HUB Site 110 (FIG. 1) considers the primary ad splicer 112 reachable through the router 111 (even though the primary ad splicer 112 is in the failure mode).

In turn, the ad traffic intended for the primary ad splicer 112 is routed to the redundant ad splicer 122 based on the floating static route installed in the routing table and redistribution of the installed floating static route into the IGP with the source traffic IP address (S 1) including, for example, the source IP address of the pre spliced multicast traffic and the ad splicer IP address for the ad traffic. In addition, the router 121 is configured to install the static mroute with OIF as gigll1 as discussed above, such that the IGMP static join for destination group G 1 to be assigned to the interface specified gigl/1. Thus, the router 121 is configured to forward the pre spliced multicast traffic (S 1, G 1) over the gigll1 interface to the redundant ad splicer 122. In turn, the redundant ad splicer 122 is configured to process the incoming multicast traffic for (S 1, G 1), splices it, and transmits the post spliced traffic (S2, G2) back to the router 121 connected via the interface gigl/1.

Moreover, router 121 is configured with the associated rendezvous point (RP) mapping (for example, in the case of PIM-SM) for the destination group G2, and starts the PIM-SM registration process with the RP which, in this example, is the router 111 connected to the failed primary ad splicer 112. Thereafter, the multicast traffic is transmitted over the source tree as soon as the source tree is built, such that, the rendezvous point (RP) for router 121 allows the post spliced multicast traffic and the ad traffic on the shared tree to the intended receivers such as the QAM 113, where the shared tree (or cored based tree) is the set of paths from the RP to the complete set of group members or receivers.

Alternatively, in the case where PIM-SSM is deployed, the Router 111 is configured to build the source-group (S, G) to the router 121 substantially immediately after the IGP convergence, in which case, the router 121 puts the received multicast traffic on the source tree for the appropriate delivery to the intended receivers QAM 113.

In this manner, in one embodiment of the present invention, the router 121 directly connected to the redundant ad splicer 122 may be configured to dynamically route the unicast ad traffic and the pre spliced multicast traffic to the redundant ad splicer 122 when the primary ad splicer 112 fails, by for example, dynamically assigning the static IGMP group membership to the redundant ad splicer 122 by injecting the reverse mroute in the event of primary ad splicer 122 failure.

When the primary ad splicer 112 recovers from the failure mode, the Router 111 is configured to start advertising the route to the primary ad splicer 112 in its IGP. The IGP advertisement, in turn, causes the network 100 to prefer the path to the primary ad splicer 112, and remove the path advertised by router 121 directly connected to the redundant ad splicer 122. In addition, the router 121 is configured to remove the floating static route previously installed in the IGP since an IGP route with admin distance less than 250) is available (i.e., to the primary ad splicer 112). In this manner, the redundant ad splicer 122 may be freed up for subsequent backup use, and the primary ad splicer 112 may be placed back into the service.

Figure 4:
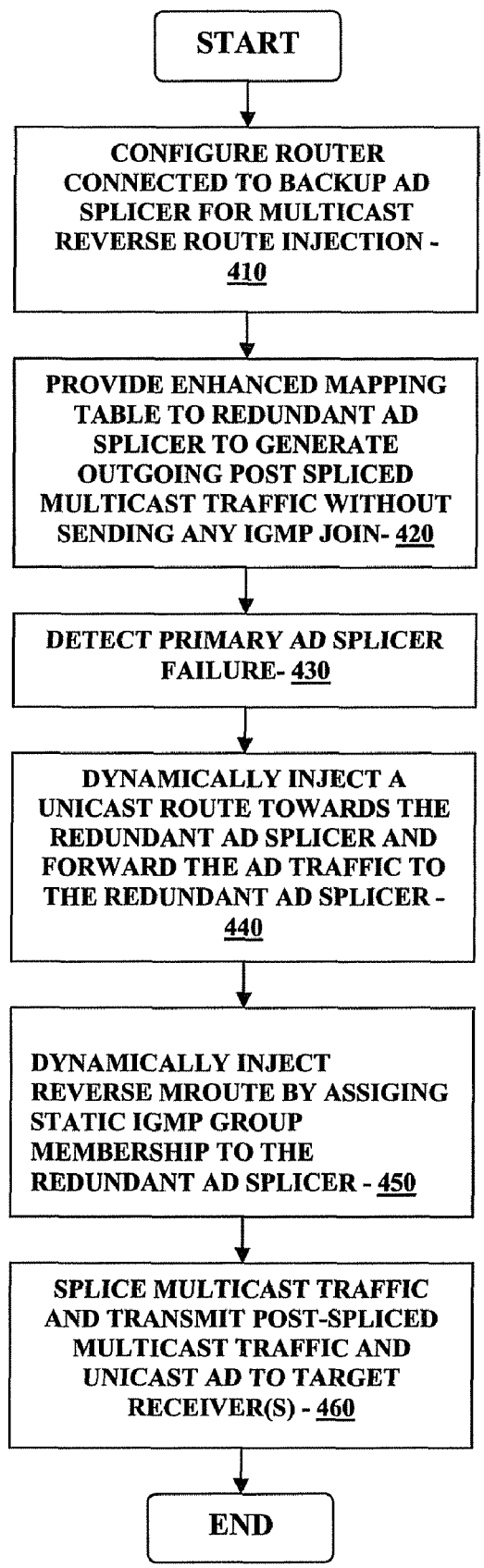
FIG. 4 is a flowchart illustrating the process for providing ad splicer redundancy in a data and content network in accordance with another embodiment of the present invention.

FIG. 4 is a flowchart illustrating the process for providing ad splicer redundancy in a data and content network in accordance with another embodiment of the present invention. Referring to FIG. 4, at step 410 the router directly connected to the redundant ad splicer in the network is configured for multicast reverse route injection. Thereafter at step 420, an enhanced mapping table is provided to the redundant ad splicer to generate outgoing post spliced multicast traffic without sending any IGMP join. When the primary ad splicer failure is detected at step 430, a unicast route towards the redundant ad splicer is dynamically injected and the ad traffic is forwarded to the redundant ad splicer at step 440. Then, at step 450, the reverse mroute is dynamically injected by assigning static IGMP group membership to the redundant ad splicer. Thereafter, at step 460 the pre-spliced multicast traffic is spliced and the post spliced multicast traffic and the unicast ad traffic is transmitted to the intended receivers in the network.

Referring back to the Figures, when the primary ad splicer 112 connected to router 111 fails, the router 121 directly connected to the redundant ad splicer 122 is configured to dynamically assign the IGMP membership to a specified interface, for example, the Gigabit Ethernet interface gigll1 without receiving an IGMP report on that interface gigll1. More specifically, the router 121 may be configured to dynamically inject an mroute without a specified OIF in the mrouting table when a predefined event occurs, for example, when a specific static unicast route (with or without the tag value) is installed in the routing table. In this manner, in one embodiment of the present invention, multicast reverse route injection may be performed based on the installation of the unicast static route. For example, the multicast reverse route injection may be performed by expanding the existing static route to associate the unicast and multicast static routes, or by performing IPPS IGMP policy propagation using static routing, as discussed in further detail below.

In the case where the multicast reverse routing injection is performed by expanding the existing static route to associate the unicast and the multicast static routes, each static route may be expanded to incorporate the static mroute as illustrated by the following:

ip route<primary ad splicer 112 IP address>gigll1 254 inject <G 1 or S 1, G 1> where the "inject" above is provided as a sample knob to inject the *, G, or S, Gentry in the mrouting table with the gigll1 as the outgoing interface (OIF).

Alternatively, as discussed above, the multicast reverse routing injection may be performed by IPPS-IGMP policy propagation using static routing. That is, the existing unicast static route CLI is retained and a tag value is used within the floating static route to install the static mroute. In other words, when a unicast static route with a predetermined tag value becomes available, the IGMP membership is triggered so that the IGMP Group membership is dynamically assigned.

Accordingly, within the scope of the present invention, there is provided a redundant and/or backup ad splicer that may be configured to assume the role of the failed ad splicer in the network by receiving both the advertisement traffic, and the pre-spliced multicast content from the network, and to transmit the post spliced traffic including the post spliced multicast traffic and the ad traffic back to the network for transmission to the target receivers in the network. Accordingly, in one embodiment, the IP network may be configured to be dynamically modified to re-route the pre-spliced traffic to the backup ad splicer from the failed ad splicer path, and to deliver the post spliced traffic to the target receivers such as QAM during the time period when the failed ad splicer is not functioning.

More specifically, in one embodiment, an mroute with a specified OIF may be configured to be dynamically injected in the mrouting table when a predetermined event occurs, such as based on the installation of a specific static unicast route in the routing table. That is, as discussed above, the IGMP Group membership may be dynamically assigned to a specified interface (such as the interface between the backup ad splicer and the router directly connected to the backup ad splicer) based on the predetermined event occurrence without any IGMP report on the specified interface.

In the manner described above, in accordance with the various embodiments of the present invention, there are provided methods and systems to minimize or avoid the requirement of on-site repair, to minimize or avoid the installation of a redundant ad splicer in every HUB site, to reduce the end to end service disruption due to ad splicer failure to substantially less than one minute, and further, to improve the overall mean time to repair (MTTR) network downtime due to ad splicer failure by providing dynamic ad splicer redundancy.

Moreover, in accordance with the various embodiments of the present invention, a single ad splicer may be configured to back up more than one ad splicer for multiple HUB sites, providing equipment cost effectiveness and efficiency. In addition, IP routing protocols such as IGP and PIM may be used to implement the network based ad splicer redundancy to increase operational efficiency and take advantage of the benefits derived from the IP routing protocols.

A method of providing ad splicer redundancy in a network in one embodiment of the present invention includes monitoring an availability of a first ad splicer, dynamically forwarding a unicast and a multicast traffic intended for the first ad splicer to a second ad splicer, receiving a post spliced multicast traffic, and transmitting the post spliced multicast traffic to one or more target receivers.

In one aspect, monitoring the availability of the first ad splicer may include detecting a first ad splicer failure on a first routing device, and detecting an installation of a predetermined unicast routing information.

In another aspect, dynamically forwarding the unicast traffic may include configuring a floating unicast static route towards the second ad splicer with a predetermined static metric value, where floating unicast static route may include an Internet Protocol (IP) address of the first ad splicer, and further, where the predetermined static metric value may include an artificially high static metric value.

In yet another aspect, dynamically forwarding the pre-spliced multicast traffic may include injecting one or more reverse mroutes towards the second ad splicer.

Moreover, injecting the reverse mroute may include assigning a static Internet Group Management Protocol (IGMP) group membership to an interface coupling the second ad splicer.

In still another aspect of the present invention, the method may also include detecting an operational mode notification of the first ad splicer, withdrawing a reachability information of the first ad splicer, and triggering an installation of a floating static route to the first ad splicer.

A method of providing ad splicer redundancy in a network in another embodiment of the present invention includes detecting a failure mode of a first ad splicer, installing a floating static route towards a second ad splicer, forwarding a unicast traffic to the second ad splicer, forwarding pre spliced multicast traffic to the second ad splicer, receiving a corresponding spliced multicast traffic from the second ad splicer, and transmitting the post spliced multicast traffic to one or more receiver terminals.

The unicast traffic may include advertisement traffic.

In one aspect, transmitting the post spliced multicast traffic may include sending the post spliced multicast traffic on a shared or source tree to the one or more receiver terminals.

In a further aspect, the method may also include detecting an operational mode notification of the first ad splicer, withdrawing a reachability information of the first ad splicer, and triggering an installation of a floating static route to the first ad splicer.

An apparatus in yet another embodiment of the present invention includes a network interface, one or more processors coupled to the network interface, and a memory storing instructions which, when executed by the one or more processors, causes the one or more processors to detect a failure mode of a first ad splicer, dynamically forward a unicast and a multicast traffic to a second ad splicer via the network interface, and receive a post spliced multicast traffic from the second ad splicer via the network interface.

The memory may be further configured for storing instructions which, when executed by the one or more processors, causes the one or more processors to transmit the post spliced multicast traffic over the data network.

In one aspect, the memory may be further configured for storing instructions which, when executed by the one or more processors, causes the one or more processors to detect the failure mode of the first ad splicer on a first routing device operatively coupled to the first ad splicer.

The memory in another aspect may be further configured for storing instructions which, when executed by the one or more processors, causes the one or more processors to install a floating unicast static route towards the second ad splicer with a predetermined static metric value, where the floating unicast static route may include an Internet Protocol (IP) address of the first ad splicer, and further, where predetermined static metric value may include an artificially high static metric value.

The memory may be further configured for storing instructions which, when executed by the one or more processors, causes the one or more processors to inject one or more reverse mroutes towards the second ad splicer.

In yet another aspect, the memory may be further configured for storing instructions which, when executed by the one or more processors, causes the one or more processors to assign a static Internet Group Management Protocol (IGMP) group membership to an interface coupling the second ad splicer.

The network interface may include a router.

An apparatus in accordance with still another embodiment of the present invention includes a network interface, one or more processors coupled to the network interface, and a memory storing instructions which, when executed by the one or more processors, causes the one or more processors to install a floating static route towards a second ad splicer, forward a unicast traffic and pre spliced multicast traffic to the second ad splicer via the network interface, and receive a corresponding spliced multicast traffic from the second ad splicer via the network interface.

The memory is further configured for storing instructions which, when executed by the one or more processors, causes the one or more processors to send the post spliced multicast traffic on a shared or source tree to the one or more receiver terminals.

A system for providing ad splicer redundancy in a network in accordance with still another embodiment of the present invention includes means for detecting a failure mode of a first ad splicer, means for dynamically forwarding a pre-spliced traffic for the first ad splicer to a second ad splicer, means for receiving a post spliced multicast traffic, and means for transmitting the post spliced multicast traffic.

The various processes described above including the processes performed by the routers 112, 121 in the software application execution environment in the network 100 including the processes and routines described in conjunction with FIGS. 2-4, may be embodied as computer programs developed using an object oriented language that allows the modeling of complex systems with modular objects to create abstractions that are representative of real world, physical objects and their interrelationships. The software required to carry out the inventive process, which may be stored in the memory (not shown) of the routers 112, 121, may be developed by a person of ordinary skill in the art and may include one or more computer program products.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of providing ad splicer redundancy in a network, comprising the steps of:
    monitoring an availability of a first ad splicer that receives a unicast ad traffic addressed to the first ad splicer and a pre-spliced multicast traffic, and produces a post-spliced multicast traffic;
    detecting a failure of the first ad splicer;
    dynamically forwarding, in response to the detected failure of the first ad splicer, the unicast ad traffic and the pre-spliced multicast traffic to a second ad splicer;
    utilizing the forwarded unicast ad traffic addressed to the first ad splicer and the pre-spliced multicast traffic by the second ad splicer to generate the post-spliced multicast traffic;
    receiving at a router the post-spliced multicast traffic from the second ad splicer; and
    transmitting the post-spliced multicast traffic generated by the second ad splicer is to one or more target receivers.

2. The method of claim 1 wherein the step of monitoring the availability of the first ad splicer includes:
    detecting a first ad splicer failure on a first routing device; and
    detecting an installation of a predetermined unicast routing information.

3. The method of claim 1 wherein the step of dynamically forwarding the unicast traffic includes the step of configuring a floating unicast static route towards the second ad splicer with a predetermined static metric value.

4. The method of claim 3 wherein the floating unicast static route includes an Internet Protocol (IP) address of the first ad splicer.

5. The method of claim 3 wherein the predetermined static metric value includes an artificially high static metric value.

6. The method of claim 1 wherein the step of dynamically forwarding the prespliced multicast traffic includes the step of injecting one or more reverse mroutes towards the second ad splicer.

7. The method of claim 6 wherein the step of injecting the reverse mroute includes the step of assigning a static Internet Group Management Protocol (IGMP) group membership to an interface coupling the second ad splicer.

8. The method of claim 1 further including the steps of:
    detecting an operational mode notification of the first ad splicer;
    withdrawing a reachability information of the first ad splicer; and
    triggering an installation of a floating static route to the first ad splicer.

9. A method of providing ad splicer redundancy in a network, comprising the steps of:
    detecting a failure mode of a first ad splicer;

installing, at a router coupled to a second ad splicer, a floating static route that includes a network address of the first ad splicer, the floating static route specifying an outgoing interface of the router that is coupled to the second ad splicer;

forwarding to the second ad splicer a unicast traffic addressed to the first ad splicer, using the floating static route installed at the router;

forwarding pre spliced multicast traffic to the second ad splicer;

receiving a post spliced multicast traffic from the second ad splicer; and transmitting the post spliced multicast traffic to one or more receiver terminals.

10. The method of claim 9 wherein the step of transmitting the post spliced multicast traffic includes the step of sending the post spliced multicast traffic on a shared or source tree to the one or more receiver terminals.

11. The method of claim 9 further including the steps of:
detecting an operational mode notification of the first ad splicer;
withdrawing a reachability information of the first ad splicer; and
triggering an installation of a floating static route to the first ad splicer.

12. An apparatus, comprising:
a network interface;
one or more processors coupled to the network interface; and
a memory for storing instructions which, when executed by the one or more processors, causes the one or more processors to
detect a failure mode of a first ad splicer,
dynamically forward, in response to the detected failure of the first ad splicer, a unicast traffic addressed to the first ad splicer and a multicast traffic to a second ad splicer via the network interface,
receive a post spliced multicast traffic from the second ad splicer via the network interface, and
transmit the post spliced multicast traffic to one or more target receivers.

13. The apparatus of claim 12 wherein the memory is further configured for storing instructions which, when executed by the one or more processors, causes the one or more processors to detect the failure mode of the first ad splicer on a first routing device operatively coupled to the first ad splicer.

14. The apparatus of claim 12 wherein the memory is further configured for storing instructions which, when executed by the one or more processors, causes the one or more processors to install a floating unicast static route towards the second ad splicer with a predetermined static metric value.

15. The apparatus of claim 14 wherein the floating unicast static route includes an Internet Protocol (IP) address of the first ad splicer.

16. The apparatus of claim 14 wherein the predetermined static metric value includes an artificially high static metric value.

17. The apparatus of claim 12 wherein the memory is further configured for storing instructions which, when executed by the one or more processors, causes the one or more processors to inject one or more reverse mroutes towards the second ad splicer.

18. The apparatus of claim 17 wherein the memory is further configured for storing instructions which, when executed by the one or more processors, causes the one or more processors to assign a static Internet Group Management Protocol (IGMP) group membership to an interface coupling the second ad splicer.

19. The apparatus of claim 12 wherein the network interface includes a router.

20. An apparatus, comprising:
a network interface;
one or more processors coupled to the network interface; and
a memory storing instructions which, when executed by the one or more processors, causes the one or more processors to
install a floating static route that includes an address of a first ad splicer and specifies the network interface as an outgoing interface, the network interface coupled to a second ad splicer,
forward to the second ad splicer via the network interface a unicast traffic addressed to the first ad splicer using the installed floating static route
forward a pre spliced multicast traffic to the second ad splicer via the network interface, and
receive a post spliced multicast traffic from the second ad splicer via the network interface.

21. The apparatus of claim 20 wherein the memory is further configured for storing instructions which, when executed by the one or more processors, causes the one or more processors to send the post spliced multicast traffic on a shared or source tree to the one or more receiver terminals.

22. The apparatus of claim 20 wherein the network interface includes a router.

23. A system for providing ad splicer redundancy in a network, comprising:
means for detecting a failure mode of a first ad splicer;
a router having a plurality of network interfaces, the router configured to dynamically forward, in response to the detected failure mode of the first ad splicer, a pre-spliced traffic addressed to the first ad splicer to a second ad splicer from one or more of the network interfaces;
means for receiving a post spliced multicast traffic from the second ad splicer; and
means for transmitting the post spliced multicast traffic to one or more target receivers.

* * * * *

UNITED STATES PATENT AND TRADEMARK OFFICE
CERTIFICATE OF CORRECTION

| | |
|---|---|
| PATENT NO. | : 7,987,259 B2 |
| APPLICATION NO. | : 11/422308 |
| DATED | : July 26, 2011 |
| INVENTOR(S) | : Rajiv Asati et al. |

It is certified that error appears in the above-identified patent and that said Letters Patent is hereby corrected as shown below:

Col. 2, line 15-16: "communication with a content source terminal 130 and ~~5~~ the ad server 140, and"

Col. 2, line 23: "with the router 121 and the redundant ad ~~10~~ splicer 122 may"

Col. 3, line 28: "router (conf)#ip route ~~<S1>~~ <S1>giglll 254"

Col. 5, line 37: "traffic (~~S1~~ S1, G1) even if it did not send out an (~~S1~~ S1, G1) IGMP"

Col. 5, line 63-64: "failed primary ad splicer 112 such that,——— the devices and terminals in the"

Signed and Sealed this
Seventeenth Day of April, 2012

David J. Kappos
*Director of the United States Patent and Trademark Office*